US006665098B1

(12) United States Patent
Nagarajan (10) Patent No.: US 6,665,098 B1
(45) Date of Patent: Dec. 16, 2003

(54) DYNAMIC USER INTERFACE BASED ON FREQUENCY OF USER SETTINGS

(75) Inventor: Ramesh Nagarajan, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/513,786

(22) Filed: Feb. 28, 2000

(51) Int. Cl.$^7$ .................................................. H04N 1/04
(52) U.S. Cl. ...................................... 358/474; 358/498
(58) Field of Search ................................ 358/474, 498

(56) References Cited

U.S. PATENT DOCUMENTS

| | | | |
|---|---|---|---|
| 4,821,107 A | 4/1989 | Naito et al. .................. 358/256 |
| 4,947,345 A | 8/1990 | Paradise et al. ............. 364/519 |
| 5,016,114 A | 5/1991 | Sakata et al. ................ 358/404 |
| 5,021,892 A | 6/1991 | Kita et al. ................... 358/468 |
| 5,031,032 A | 7/1991 | Perregaux et al. ............. 358/44 |
| 5,038,218 A | 8/1991 | Matsumoto .................. 358/296 |
| 5,047,955 A | 9/1991 | Shope et al. ................ 364/519 |
| 5,113,494 A | 5/1992 | Menendez et al. ........... 395/163 |
| 5,170,340 A | 12/1992 | Prokop et al. .............. 364/143 |
| 5,175,633 A | 12/1992 | Saito et al. ................. 358/406 |
| 5,223,948 A | 6/1993 | Sakurai et al. .............. 358/404 |
| 5,233,346 A | 8/1993 | Minerd et al. .......... 340/825.52 |
| 5,276,799 A | 1/1994 | Rivshin ....................... 395/162 |
| 5,301,262 A | 4/1994 | Kashiwagi ................... 395/117 |
| 5,303,341 A | 4/1994 | Rivshin ....................... 395/162 |
| 5,307,458 A | 4/1994 | Freiburg et al. ............. 395/162 |
| 5,339,139 A | 8/1994 | Fullerton et al. ............ 355/215 |
| 5,430,536 A | 7/1995 | Fullerton et al. ............ 355/320 |
| 5,473,513 A | 12/1995 | Quinn ......................... 361/760 |
| 5,545,913 A | 8/1996 | Quinn et al. ................. 257/443 |
| 5,552,828 A | 9/1996 | Perregaux .................... 348/315 |
| 5,579,452 A | 11/1996 | Ambalavanar et al. ...... 395/115 |
| 5,602,579 A | 2/1997 | Ambalavanar et al. ...... 347/240 |
| 5,604,362 A | 2/1997 | Jedlicka et al. .............. 257/233 |
| 5,687,297 A | 11/1997 | Coonan et al. .............. 395/102 |
| 5,691,760 A | 11/1997 | Hosier et al. ................ 347/238 |
| 5,710,873 A | 1/1998 | Romano et al. ............. 395/115 |
| 5,748,344 A | 5/1998 | Rees .......................... 358/505 |

*Primary Examiner*—Edward Coles
*Assistant Examiner*—Houshang Safaipour
(74) *Attorney, Agent, or Firm*—Paul F. Daebeler; David J. Arthur (57) ABSTRACT

The present invention generally relates to a digital scanner for scanning images. More specifically, the present invention is directed to a method and apparatus for accurately scanning documents and for processing digital data to provide digital images stored in memory, which can be retrieved for printing on support material or for displaying on a display screen. The present invention updates user settings based on the use of the digital scanner by an operator.

17 Claims, 7 Drawing Sheets

DYNAMIC USER INTERFACE BASED ON FREQUENCY OF USER SETTINGS

FIELD OF THE INVENTION

The present invention generally relates to a digital scanner for scanning images. More specifically, the present invention is directed to a method and apparatus for accurately scanning documents and for processing digital data to provide digital images stored in memory, which can be retrieved for printing on support material or for displaying on a display screen. The present invention updates user settings based on the use of the digital scanner by an operator.

BACKGROUND OF THE INVENTION

In a conventional digital scanner, a light source is used to illuminate a document having the image to be scanned. The conventional digital scanner also includes a platen glass upon which the document rests and a platen cover. The light emmitted by the light source illuminates the document and is reflected off and imaged by an optical system or lens system towards either a CCD sensor array or full width array, which converts the reflected light into electrical signals which are eventually converted into digital image data. An image processing circuit electronically registers the image, and converts the electrical signals into digital image data so that the digital image data can be utilized by an image output terminal, network citizen, or memory device.

In the prior art, a printer or other digital imaging system is typically coupled to a digital scanner for scanning an original image (e.g. document) and employs an initial step of charging a photoconductive member (photoreceptor) to a substantially uniform potential. The charged surface of the photoconductive member is thereafter exposed to a light image of an original document to selectively dissipate the charge thereon in selected areas irradiated by the light image. This procedure records an electrostatic latent image on the photoconductive member corresponding to the informational areas contained within the original document being reproduced. The latent image is then developed by bringing a developer including toner particles adhering triboelectrically to carrier granules into contact with the latent image. The toner particles are attracted away from the carrier granules to the latent image, forming a toner image on the photoconductive member, which is subsequently transferred to a copy sheet. The copy sheet having the toner image thereon is then advanced to a fusing station for permanently affixing the toner image to the copy sheet.

The approach utilized for multicolor electrostatographic printing is substantially identical to the process described above. However, rather than forming a single latent image on the photoconductive surface in order to reproduce an original document, as in the case of black and white printing, multiple latent images corresponding to color separations are sequentially recorded on the photoconductive surface. Each single color electrostatic latent image is developed with toner of a color complimentary thereto and the process is repeated for differently colored images with the respective toner of complimentary color. Thereafter, each single color toner image can be transferred to the copy sheet in superimposed registration with the prior toner image, creating a multi-layered toner image on the copy sheet. Finally, this multi-layered toner image is permanently affixed to the copy sheet in substantially conventional manner to form a finished copy.

There is a need to provide digital scanners to satisfy a wide variety of requirements based on customer environments (production equipment, office equipment, and home equipment). The traditional approach was to provide different versions of software for different customer environments to satisfy the customers' various requirements. For example, in a production environment, image quality is considered very important and the operators (users) try to reproduce their pictorials as true to the original as possible. In this type of operating environment, the user interface might provide a magazine mode with weak background suppression and the tonal reproduction curve (TRC) would be a one-to-one TRC. In an office environment, the users frequently copy originals, which were printed by a laser printer. Therefore, these users are more concerned about the second side showing through the paper, background suppression and text quality. Therefore, a higher contrast TRC is used. Although prior art scanners can save manually inputted default settings, there is a need for a dynamic user interface to automatically update the digital scanner to meet various customer requirements.

SUMMARY OF THE INVENTION

A dynamic user interface for a digital scanner, comprising: means for receiving a scan image command, which includes image processing parameters; means for incrementing a scancount; means for scanning an image and storing image processing parameters; means for analyzing processing parameters after reaching a predetermined scancount to detect trends in image processing parameters; and means for remapping processing parameters based on the detected trends.

A method for updating image processing parameters comprising: receiving a scan image command, which includes image processing parameters; incrementing a scancount; scanning an image; storing image processing parameters; analyzing image processing parameters after reaching a predetermined scancount to detect trends in image processing parameters; and remap the image processing parameters based on the detected trends.

DESCRIPTION OF THE PREFERRED EMBODIMENTS

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined in the appended claims.

The present invention addresses the need for fast, high quality digital scanners, capable of being connected to a wide array of copiers, printers, computers, networks, facsimile machines, etc., and capable of scanning and producing complex and interesting images to be stored, printed or displayed. The images may include text, graphics, and scanned or computer-generated images. Therefore, the present invention is directed toward a digital scanner capable of quickly acquiring, processing, storing and outputting digital images of documents. In order to perform these tasks, the present invention provides a system in which user settings (including image processing parameters) are being monitored and updated by a workstation and/or a digital scanner. Examples of the user settings are background suppression level, toner reproduction curve (TRC) curve selection, lighter/darker setting, contrast setting, sharpness setting, copy/scan mode, etc.

Generally, once a sufficient number of samples is collected (e.g. images scanned), the user settings and image processing parameters are analyzed to determine a trend. If a trend is observed, then the user settings would be changed to the most commonly used settings. For example, if the trend analysis shows that the most common users make use of the magazine (high frequency halftone) and text mode, then the segmentation parameters (class table information that maps the peaks and gradients to classes or segmentation tags) could be modified to bias in the high frequency halftone side. This would help in eliminating the segmentation artifacts in the most often used magazine and text mode and would err on the other less frequently used modes. Similarly, if most of the users copy two-sided originals which would result in second side show-through problems, then the background suppression level would be raised to a stronger level.

Once the statistics of user settings are collected and analyzed, this information may be used for dynamically adjusting user settings including image processing parameters.

For a general understanding of the present invention, reference is made to the drawings. In the drawings and in the specification, like reference numerals have been used throughout to designate identical or equivalent elements or steps.

Figure 1:
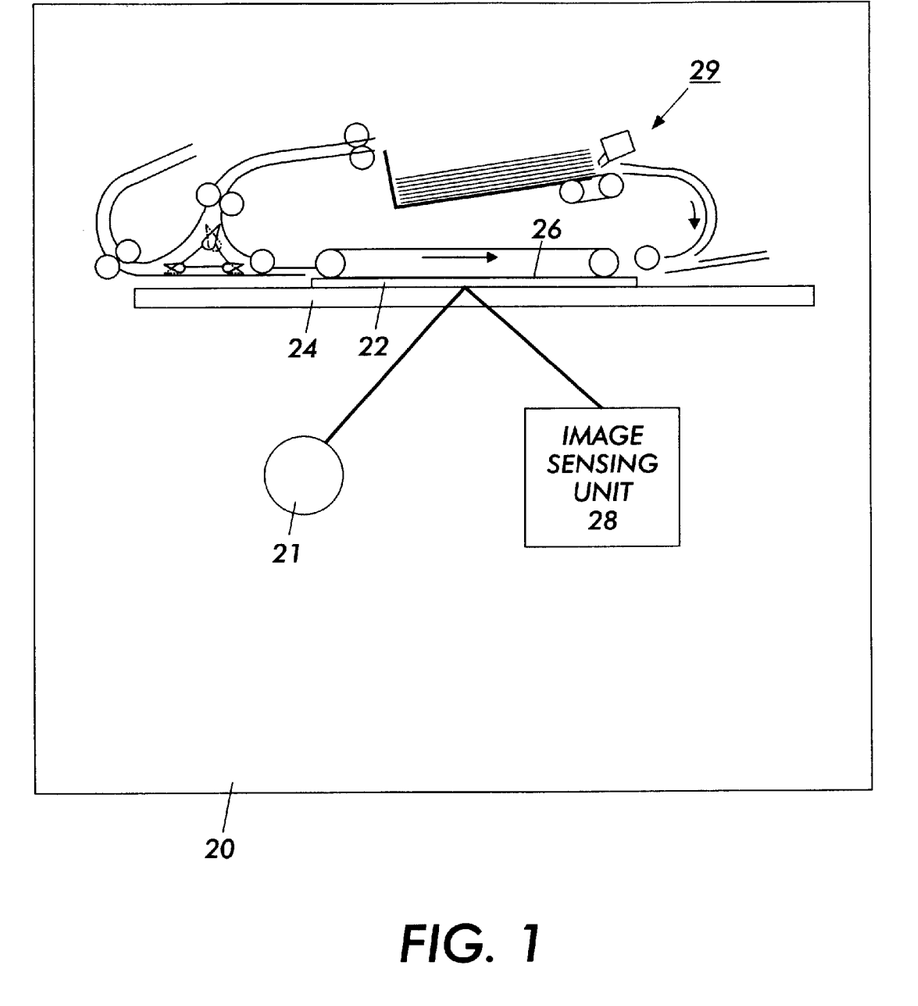
FIG. 1 is a diagram illustrating components of a conventional digital scanner.

FIG. 1 illustrates components of a scanning unit 20 in a digital scanner. In the scanning unit 20, a light source 21 is used to illuminate a document 22 to be scanned. In a platen type-scanning situation, the document 22 usually rests upon a glass platen 24 which supports the document 22 for scanning purposes. The document may be placed on the glass platen 24 by an operator. Alternatively, the scanning unit 20 may include a feeder or document handler 29, which places the document on the glass platen 24. Another example of a feeder is shown in U.S. Pat. No. 5,430,536.

On top of the glass platen 24 and the document 22, a backdrop portion (platen cover) 26 is placed so as to prevent stray light from leaving the scanning area and to provide a background from which an input document can be distinguished. The backdrop portion 26 is part of document handler 29. The backdrop portion 26 is the surface or surfaces that can be scanned by an image-sensing unit 28 when a document is or is not present in the scanning station. The light reflected from the document passes through a lens subsystem (not shown) so that the reflected light impinges upon an image sensing unit 28, such as a charged coupled device (CCD) array or a full width array. An example of a full width array is found in U.S. Pat. No. 5,473,513. U.S. Pat. Nos. 5,748,344; 5,552,828; 5,691,760; 5,031,032; 5,545,913; and 5,604,362 provide examples of different full width arrays. A full width array typically comprises one or more linear arrays of photosites, wherein each linear array may be sensitive to one or more colors. In a full color digital scanner, the linear arrays of photosites are used to produce electrical signals which are converted to color image data representing the document that is being scanned. However, in a black/white scanner, preferably only one linear array of photosites is utilized to produce electrical signals which are converted to the black and white image data representing the image of the document, which was scanned.

Figure 2:
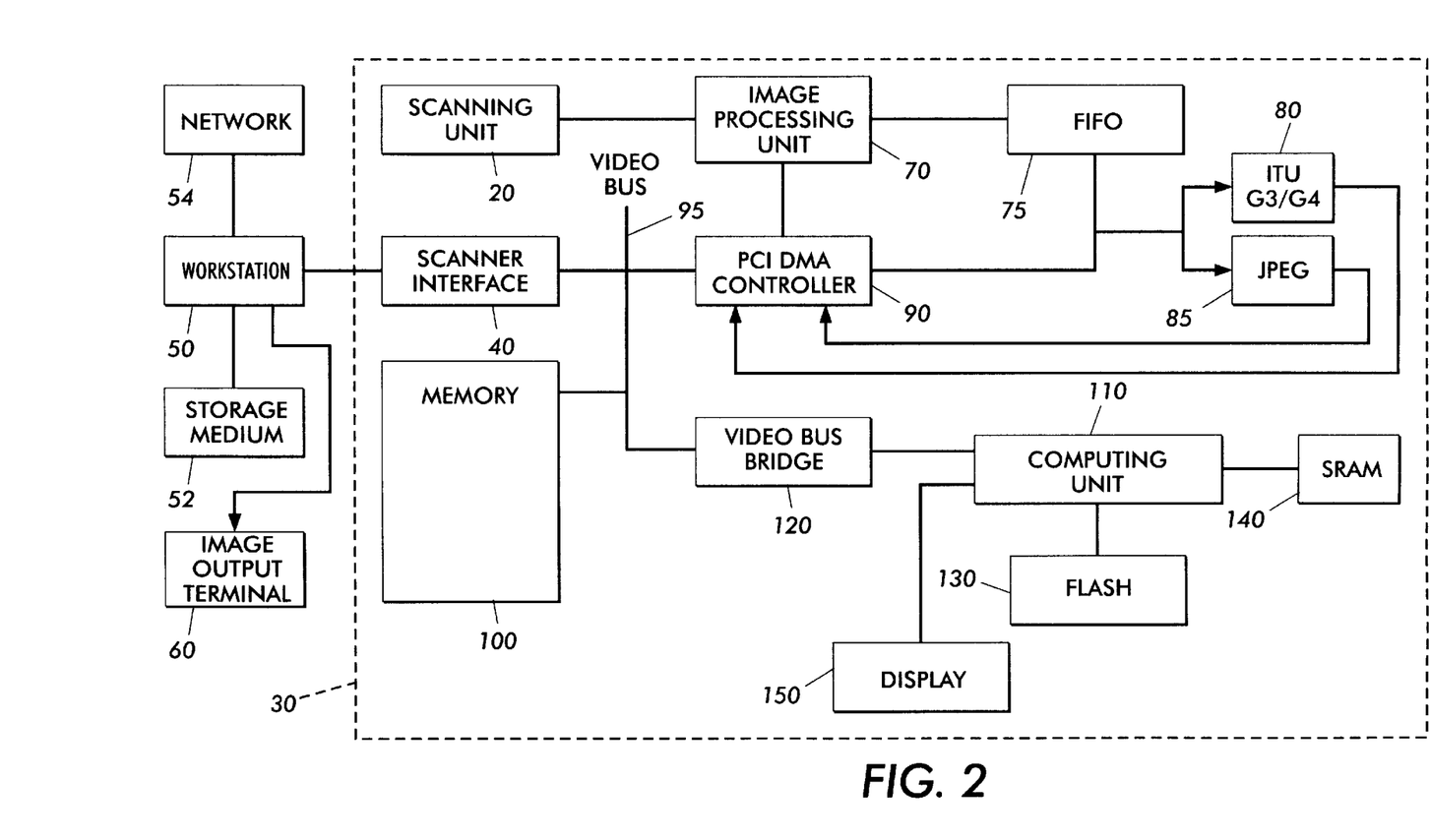
FIG. 2 is a block diagram illustrating the electronic architecture of a digital scanner coupled to a workstation, network, storage medium and image output terminal in accordance with embodiments of the present invention.

FIG. 2 is a block diagram illustrating the electronic architecture of a digital scanner 30 including the scanning unit 20. The digital scanner 30 is coupled to a workstation 50 by way of a scanner interface 40. An example of a scanner interface 40 is a SCSI interface. Examples of the workstation 50 include a personal computer and a computer terminal. The workstation 50 includes and/or accesses a storage medium 52. The workstation 50 is preferably adapted to communicate with a computer network 54, and to communicate with the Internet either directly or through the computer network 54. The workstation 50 includes a graphical user interface. The digital scanner 30 is preferably coupled to at least one image output terminal (IOT) 60, such as a printing system. The digital scanner 30 may also be connected to a network, main frame computer through a computer terminal, or other host-computing unit, which has a graphical user interface.

The scanning unit 20 scans an image and converts the analog signals received by the image sensing unit 28 into digital signals (digital data). An image processing unit 70 registers each image, and preferably executes signal correction to enhance the digital signals. As the image processing unit 70 continuously process the digital signals, the FIFO (first in first out buffer) 75 temporarily stores the digital data outputted by the image processing unit 70, and transmits the digital data to the International Telecommunications Union (ITU) G3/G4 80 and Joint Photographic Experts Group (JPEG) 85 in bursts, so that the processed digital data is compressed. Other data compression units may be substituted for ITU G3/G4 80 and JPEG 85. The compressed digital data is stored in memory 100 preferably by way of Peripheral Component Interconnect Direct Memory Access (PCI DMA) Controller 90 and video bus 95. Alternatively, an operator may not wish to compress the digital data. The operator may bypass the compression step so that the digital data processed by the image processing unit 70 is sent through the FIFO 75 and directly stored in memory 100 by way of PCI DMA Controller 90.

A computing unit 110, such as a microprocessor, is coupled to the scanner interface 40, memory 100 and PCI DMA Controller 90 by way of the video bus 95 and video bus bridge 120. The computing unit 110 is also coupled to a FLASH 130, static RAM 140, and display 150. The computing unit 110 is also connected to the scanning unit 20 and the image processing unit 70 by way of a control/data bus. For, example, the computing unit 110 may be communicating with the image processing unit 70 through the video bus 95 and/or PCI DMA Controller 90. Alternatively, the computing unit 110 may communicate directly with different components such as the image processing unit 70 by way of control/data bus(es) (not shown).

Figure 3:
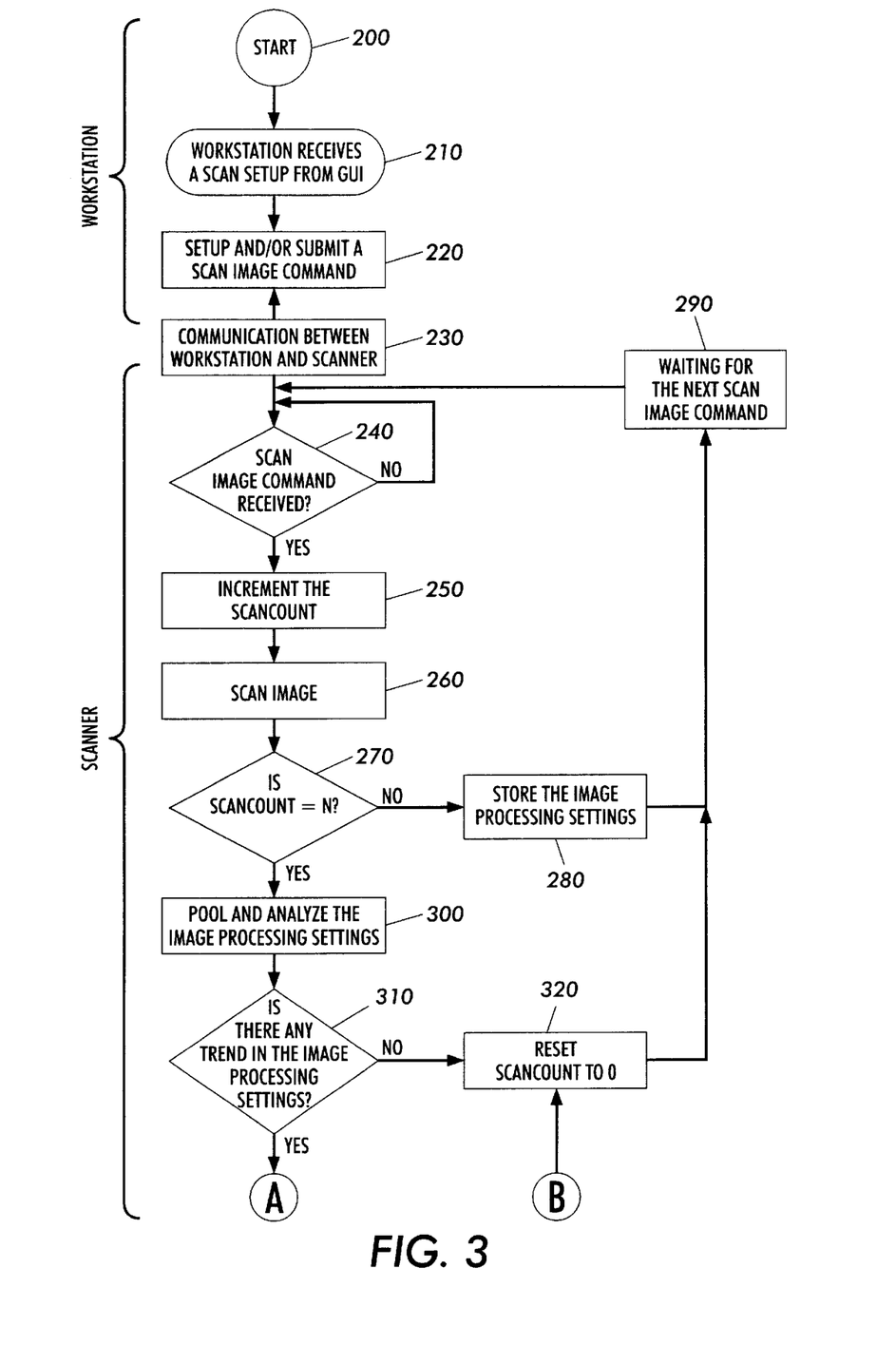
FIGS. 3–4 are flow diagrams showing the first embodiment of the present invention.
Figure 4:
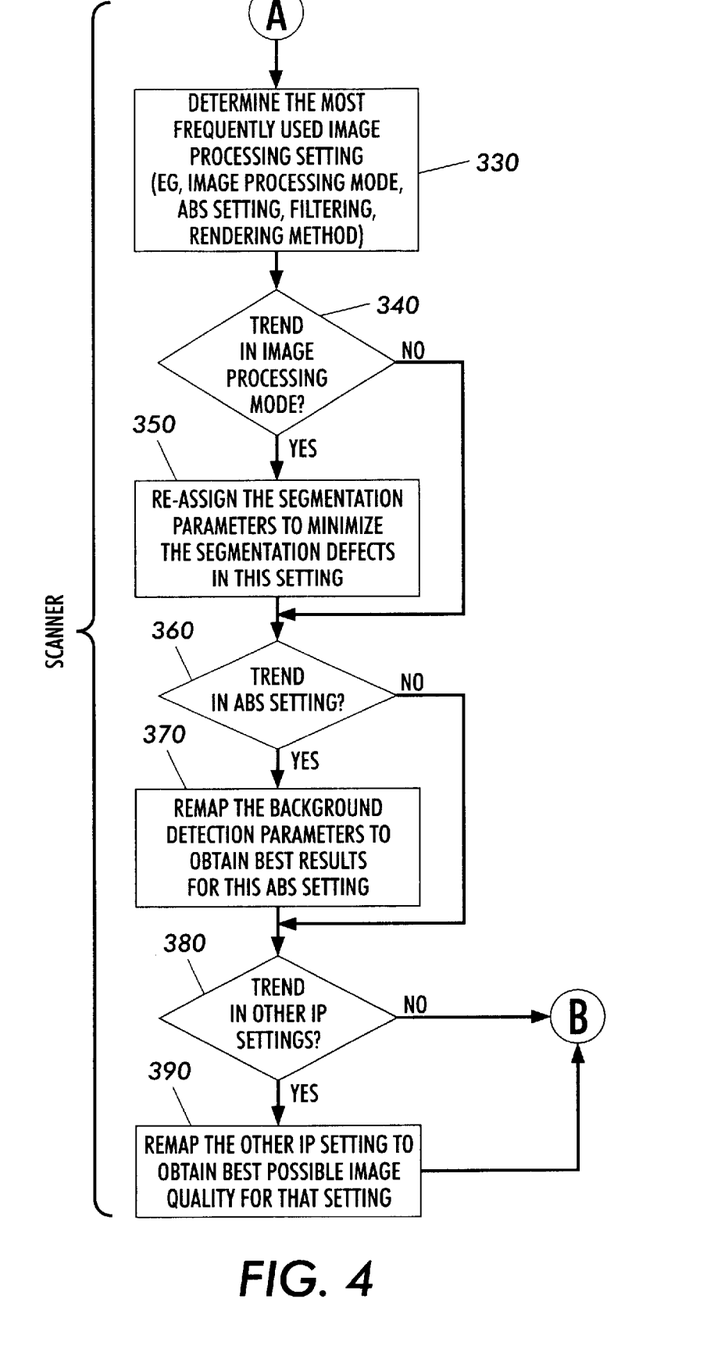

FIGS. 3–4 are flow diagrams showing the first embodiment of the dynamic user interface of the present invention. Once the digital scanner 30 and workstation 50 are booted up (200) and the workstation 50 receives a scan setup command from the operator (user) by way of the graphical user interface (210), the workstation 50 is initialized for communication with the digital scanner 30, and the workstation 50 transmits a scan image command to the digital scanner 50 (220 and 230). The scan setup command from the graphical user interface (GUI) includes user settings for the workstation 50, while the scan image command includes user settings for the digital scanner 30. The scan image command provides the information about the scan job. It contains the list of user settings that are necessary to control the digital scanner 30 which includes the settings (parameters) for the scanning unit 20, and the image processing unit 70.

After the digital scanner 30 is booted up or initialized, the digital scanner 30 also establishes communication with workstation 50 (230) and waits for a scan image command from workstation 50 (240). Once the scan image command is received from the workstation 50 (240), the scancount (representing the number of images scanned since the last time the user settings were analyzed) is incremented (250) and the digital scanner 30 scans the image (260). The scancount may be stored and updated in a register in computing unit 110, for example. If the scancount is not equal to a predetermined number N, then the image processing settings (parameters) are stored in a memory such as Flash 130 (270, 280). The digital scanner 30 waits for the next scan image command from workstation 50 (290). If the scancount is equal to the predetermined number N (270), then the image processing settings are pooled and analyzed (300) from memory (e.g. flash 130) by computing unit 110. If there is no trend in the image processing settings (310), the scancount is reset to zero (320) and the digital scanner 30 waits for the next scan image command from the workstation 50 (290).

If there is a trend in the image processing settings (310), then the computing unit 110 determines the most frequently used image processing settings (330). These image processing settings are used by the image processing unit 70, which communicates with the computing unit 110 by way of video bus 95 and video bus bridge 120, to process the scanned images. Image processing mode, autobackground suppression (ABS) setting, TRC selection Lighter/Darker and contrast setting, filtering and rendering are all examples of image processing (IP) settings (parameters). Examples of image processing modes include text mode, photograph mode, high frequency halftone mode, low frequency halftone mode, newspaper mode, laserprint mode, etc. (340).

Regarding the ABS parameter, when making black and white scans of originals with colored or shaded backgrounds, the digital scanner 30 will render the background as halftone. The background may even make the foreground image unreadable. To prevent this, the ABS setting is used to remove the background shading. The different suppression levels provided (e.g. mild, normal, strong and very strong) for background suppression dictates the amount of background that needs to be surpressed.

Regarding the filtering parameter, there are at least two types of filtering provided to the operator. One type of filter is a Sharpen filter that increases edge contrasts in the image. This has the effect of making objects stand out and gives sharp, clean edges. The different levels of sharpness (e.g. 0 to 5) allow the user to pick the amount of enhancement that needs to be applied to the input image. Another type of filter is a descreen filter. A descreen filter is primarily used for removing halftone screens from the original image. The different levels of descreen filter (e.g. 0 to 5) allow the user to pick the amount of descreening (or blurring) to be applied to the input image.

Regarding the rendering parameter, rendering converts the input 8 bits per pixel gray image into less than 8 bits per pixel image (typically 1 bit per pixel binary image). However, other gray scales may be used with higher bits/pixel such as 10 or 16 bits/pixel. There are at least four types of rendering provided to the user—threshold, error diffusion, halftone and hybrid screen. Threshold rendering converts all pixels below a set value to black and all pixels above that set value to be white. This is useful for solid text and provides a very high contrast output. Error Diffusion gives the illusion of gray shading in the output image by preserving the average gray level of the input image within a local area. For each incoming pixel, error diffusion converts an 8 bit value to 1 bit value and then propagates or diffuses the error introduced to the pixels downstream (that are yet to be binarized). The end result is a black and white image that has the appearance of gray shades, preserving the appearance of gradient filled and halftoned text. Halftones use a grid-like pattern of dots to give the appearance of shading. The incoming image is compared against a set of threshold array (also called halftone screen thresholds) and a binary output is generated. Hybrid screening combines halftoning and error diffusion rendering methods. A modulation level allows the user to control the weighting to be applied to each of the two rendering method.

Other types of image processing settings and other types of user settings may also be analyzed.

Returning to FIG. 4, the most frequently used image processing settings (parameters) are determined by ascertaining whether more than a certain number or certain percentage of scan jobs (e.g. 80%) use the same image processing setting (parameter) (330). If less 80% of the scan jobs have the same image processing mode, then there is no trend and the image processing mode parameter is the manually inputted or factory determined default mode (340). If 80% or more of the scan jobs have the same image processing mode, then the segmentation parameters are updated to minimize the segmentation defects in this image processing mode setting (350). Generally segmentation parameters are chosen to obtain equally good results for all of the image processing modes. By using the knowledge of the frequently used image processing mode setting, one could reassign (or remap) the segmentation parameters to reduce artifacts in this mode by sacrificing the image quality on other image processing modes.

If less than 80% of the scan jobs have the same ABS level setting, then there is no trend and the ABS level setting is the manually inputted or factory determined default mode (360). If 80% or more of the scan jobs have the same ABS level, then the detection parameters for each ABS level govern the detection of the background peak (mean graylevel and standard deviation) and the amount of background suppression that needs to be applied are updated to obtain the best results for this ABS level setting. (370). For example, if mostly users select "strong" suppression level, ABS detection could be adjusted to automatically detect the second peak or go in by more than three standard deviations beyond the detected white peak for stronger suppression. A strong suppression level indicates that the user wants all of his background to be removed. Typically for background suppression, the generic algorithm would look for the background peak graylevel and use that as the white peak. (For example, all pixels that have graylevel higher than white peak point would be clipped to white or 255 in an 8 bit system). If we have the knowledge that the users usually want a strong suppression, then the background detection could be modified to look beyond the white peak for a possible secondary peak or find 3 standard deviation beyond the white peak for determining the clipping point.

Regarding 380 and 390 in FIG. 4, these blocks represent recognizing the trends in additional image processing settings (such as TRC selection, Lighter/Darker and contrast settings, rendering and filtering) and updating the appropriate parameters if a trend is recognized as in the above two examples.

Adjusting the image processing parameters dynamically (without any user intervention) allows the user to obtain best possible image quality even in his default parameter setting. The advantage is that the user does not need to try changing manually different advanced settings to obtain the best image quality. With the knowledge of users preferred or most frequently used setting, the scanner controller automatically updates its settings to achieve best possible image quality.

Figure 5:
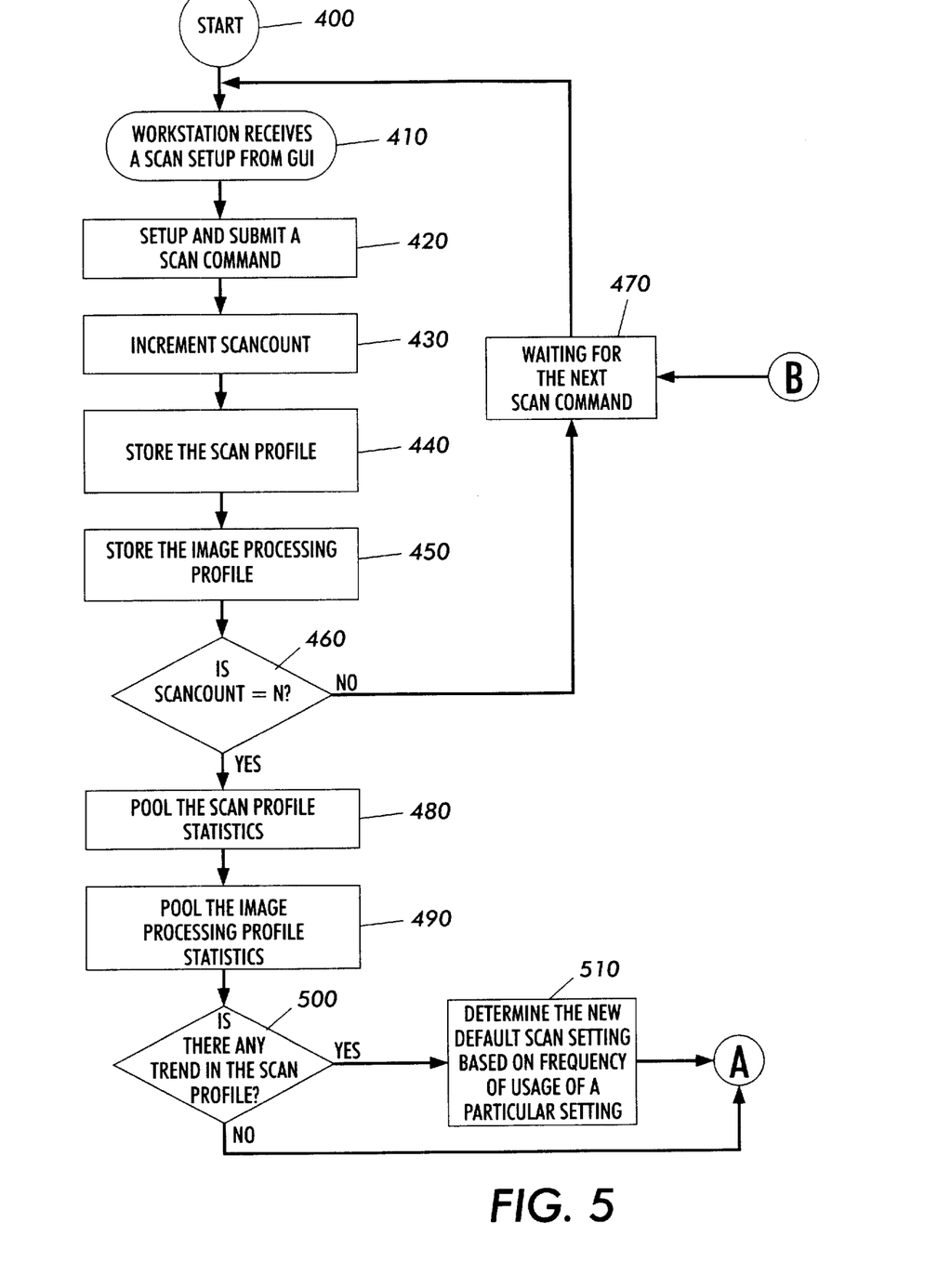
FIGS. 5–6 are flow diagrams showing the second embodiment of the present invention.
Figure 6:
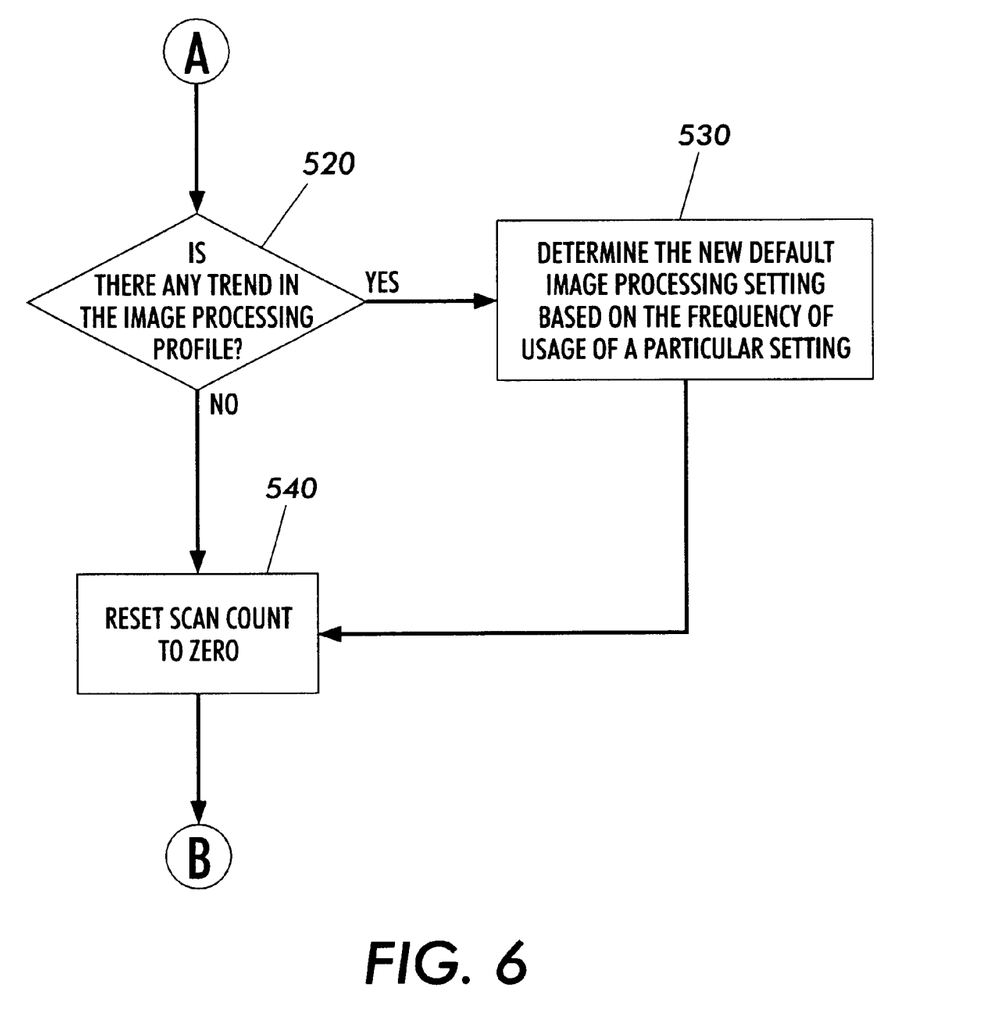

FIGS. 5–6 are flow diagrams showing the second embodiment of the dynamic user interface of the present invention. In the second embodiment of the present invention, the workstation 50 stores the scan profiles and updates the default scan settings. Scan settings include single sided, simplex, duplex, black and white vs. color, resolution, etc. The workstation 50 also stores the image processing profile which includes the image processing settings. Image processing settings include image processing mode, ABS level, filtering, rendering, TRC selection, Lighter/Darker and contrast setting, etc.

Once workstation 50 is booted up (400) and the workstation 50 receives a scan setup command from the operator (user) by way of the graphical user interface (410), the workstation 50 is initialized for communication and the workstation 50 produces a scan image command (420). The scan setup command from the graphical user interface (GUI) includes user settings for the workstation 50.

The scan count is incremented (430). The scancount may be stored and updated in the memory of the workstation 50, for example. Scan settings (scan profile) and the image processing settings (image processing file) are stored in a memory. (440, 450). If the scancount is not equal to a predetermined number N (representing the number of images scanned since the last time the user settings were analyzed), then the workstation 50 waits for the next scan image command from the graphical user interface of workstation 50 (470). If the scancount is equal to the predetermined number N (270), then the scan setting and image processing settings are pooled and analyzed (480 and 490) from the memory in the workstation 50. If there is no trend in the scan profile (scan settings) and there is no trend in the image processing profile (image processing parameters), then the scancount is reset to zero and the workstation 50 awaits the next scan command from graphical user interface (500, 520, 540, 470).

If there is a trend in the scan profile (500) or the image processing profile (520), then the new setting (parameter) is determined based on the frequency of usage of the particular setting as in the first embodiment. Then, the scancount is reset to zero and the workstation 50 awaits the next scan command from graphical user interface (540, 470). The new setting becomes the new default in the GUI. This helps the user to immediately use the setting without having to modify any of scan or image processing profiles.

Figure 7:
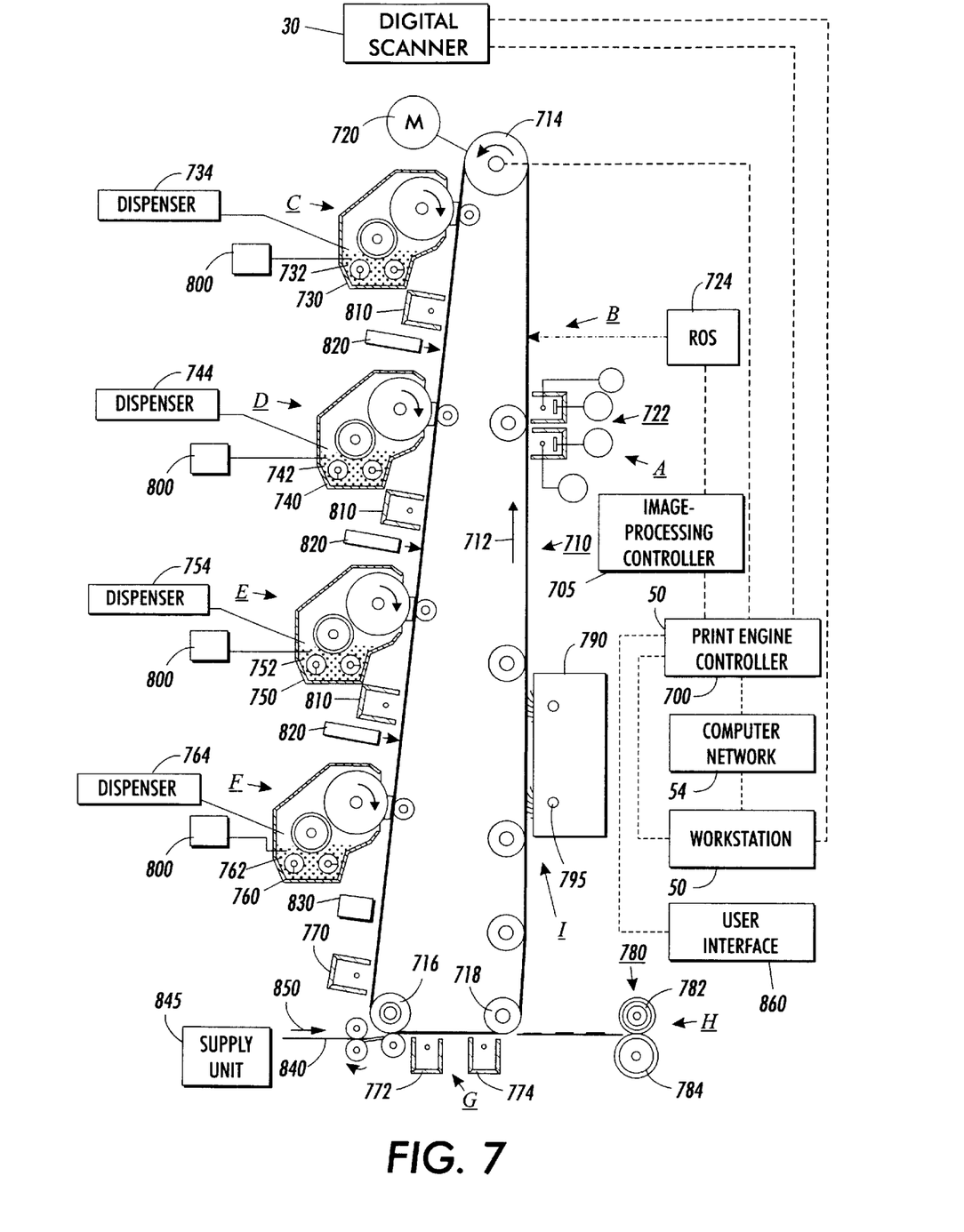
FIG. 7 is a partial schematic elevational view of an example of a digital imaging system, including a print engine, which can employ the scanner and direct memory access control system of the present invention.

FIG. 7 is a partial schematic view of a print engine of a digital imaging system, which includes a scanner having the dynamic user interface of the present invention. The imaging system is used to produce color output in a single pass of a photoreceptor belt. It will be understood, however, that it is not intended to limit the invention to the embodiment disclosed. On the contrary, it is intended to cover all alternatives, modifications and equivalents as may be included within the spirit and scope of the invention as defined by the appended claims, including a multiple pass color process system, a single or multiple pass highlight color system and a black and white printing system.

In one embodiment, an original document can be positioned in a document handler 29 or on a platen 24 of a digital scanner 30. The digital scanner 30 captures the original document (images) and converts it to digital data. This information is transmitted to an electronic subsystem (ESS) or print engine controller 700. Alternatively, digital scanner 30 captures the original document and converts it to digital data, and transmits the digital data to the workstation 50. The workstation 50 supplies the digital data to print engine controller 700. Alternatively, image signals may be supplied by a computer network 54 to print engine controller 700 by way of a workstation 50. An image-processing controller 705 receives the document information from the print engine controller 700 and converts this document information into electrical signals for the raster output scanner.

Modern scanners connected to copiers, printers, computers, networks, facsimile machines, etc. are capable of scanning and producing complex and interesting page images. The pages may include text, graphics, and scanned or computer-generated images. The image of a page may be described as a collection of simple image components or primitives (characters, lines, bitmaps, colors, etc.). Complex pages can then be built by specifying a large number of the basic image primitives. This is done in software using a page description language such as PostScript. The job of the electronic printer's software is to receive and interpret each of the imaging primitives for the page. The drawing or rasterization must be done on an internal, electronic model of the page. All image components must be collected and the final page image must be assembled before marking can begin. The electronic model of the page is often constructed in a data structure called an image buffer. The data contained is in the form of an array of color values called pixels. Each actual page and the pixel's value give the color, which should be used when marking. The pixels are organized to reflect the geometric relation of their corresponding spots. They are usually ordered to provide easy access in the raster pattern required for marking.

The printing machine preferably uses a charge retentive surface in the form of an Active Matrix (AMAT) photoreceptor belt 710 supported for movement in the direction indicated by arrow 712, for advancing sequentially through the various xerographic process stations. The photoreceptor belt 710 is entrained about a drive roller 714, tension rollers 716 and fixed roller 718 and the drive roller 714 is operatively connected to a drive motor 720 for effecting movement of the photoreceptor belt 710 through the xerographic stations. A portion of photoreceptor belt 710 passes through charging station A where a corona generating device, indicated generally by the reference numeral 722, charges the photoconductive surface of photoreceptor belt 710 to a relatively high, substantially uniform, preferably negative potential.

Next, the charged portion of photoconductive surface is advanced through an imaging/exposure station B. At imaging/exposure station B, the print engine controller 700 receives the image signals representing the desired output image from the digital scanner 30 directly, computer network 54, or work station 50 and processes these signals to convert them to the various color separations of the image. The desired output image is transmitted to a laser based output scanning device, which causes the charge retentive surface to be discharged in accordance with the output from the scanning device. Preferably the laser based scanning device is a laser Raster Output Scanner (ROS) 724. Alternatively, the ROS 724 could be replaced by other xerographic exposure devices such as an LED array.

The photoreceptor belt 710, which is initially charged to a voltage $V_0$, undergoes dark decay to a level equal to about −500 volts. When exposed at the exposure station B, it is discharged to a level equal to about −50 volts. Thus after exposure, the photoreceptor belt 710 contains a monopolar voltage profile of high and low voltages, the former corresponding to charged areas and the latter corresponding to discharged or background areas.

At a first development station C, the development station C preferably utilizes a hybrid development system including a developer structure 730. The development roll, better known as the donor roll, is powered by two development fields (potentials across an air gap). The first field is the ac field which is used for toner cloud generation. The second field is the dc development field which is used to control the amount of developed toner mass on the photoreceptor belt 710. The developer structure 730 contains magenta toner particles 732. The toner cloud causes charged magenta toner particles 732 to be attracted to the electrostatic latent image. Appropriate developer biasing is accomplished via a power supply (not shown). This type of system is a noncontact type in which only toner particles (magenta, for example) are attracted to the latent image and there is no mechanical contact between the photoreceptor belt 710 and a toner delivery device to disturb a previously developed, but unfixed, image. A toner concentration sensor 800 senses the toner concentration in the developer structure 730. A dispenser 734 dispenses magenta toner into the developer structure 730 to maintain a proper toner concentration. The dispenser 734 is controlled by print engine controller 700.

The developed but unfixed image is then transported past a second charging device 810 where the photoreceptor belt 710 and previously developed toner image areas are recharged to a predetermined level.

A second exposure/imaging is performed by device 820 which preferably comprises a laser based output structure. The device 820 is utilized for selectively discharging the photoreceptor belt 710 on toned areas and/or bare areas, pursuant to the image to be developed with the second color toner. Device 820 may be a raster output scanner or LED bar, which is controlled by print engine controller 700. At this point, the photoreceptor belt 710 contains toned and untoned areas at relatively high voltage levels and toned and untoned areas at relatively low voltage levels. These low voltage areas represent image areas which are developed using discharged area development (DAD). To this end, a negatively charged, developer material 742 comprising the second color toner, preferably yellow, is employed. The second color toner is contained in a developer structure 740 disposed at a second developer station D and is presented to the latent images on the photoreceptor belt 710 by way of a second developer system. A power supply (not shown) serves to electrically bias the developer structure 740 to a level effective to develop the discharged image areas with negatively charged yellow toner particles 742. Further, a toner concentration sensor 800 senses the toner concentration in the developer structure 740. A dispenser 744 dispenses magenta toner into the developer structure 740 to maintain a proper toner concentration. The dispenser 744 is controlled by print engine controller 700.

The above procedure is repeated for a third image for a third suitable color toner such as cyan 752 contained in developer structure 750 and dispenser 754 (station E), and for a fourth image and suitable color toner such as black 762 contained in developer structure 760 and dispenser 764 (station F). Preferably, developer structures 730, 740, 750 and 760 are the same or similar in structure. Also, preferably, the dispensers 734, 744, 754 and 764 are the same or similar in structure. The exposure control scheme described below may be utilized for these subsequent imaging steps. In this manner a full color composite toner image is developed on the photoreceptor belt 710. In addition, a permeability sensor 830 measures developed mass per unit area (developability). Although only one sensor 830 is shown in FIG. 7, there may be more than one sensor 830.

To the extent to which some toner charge is totally neutralized, or the polarity reversed, thereby causing the composite image developed on the photoreceptor belt 710 to consist of both positive and negative toner, a negative pre-transfer dicorotron member 770 is provided to condition all of the toner for effective transfer to a substrate.

Subsequent to image development a sheet of support material 840 is moved into contact with the toner images at transfer station G. The sheet of support material 840 is advanced to transfer station G by the supply unit 845 in the direction of arrow 850. The sheet of support material 840 is then brought into contact with photoconductive surface of photoreceptor belt 710 in a timed sequence so that the toner powder image developed thereon contacts the advancing sheet of support material 840 at transfer station G.

Transfer station G includes a transfer dicorotron 772 which sprays positive ions onto the backside of support material 840. This attracts the negatively charged toner powder images from the photoreceptor belt 710 to support material 840. A detack dicorotron 774 is provided for facilitating stripping of the sheets from the photoreceptor belt 710.

After transfer, the sheet of support material 840 continues to move onto a conveyor (not shown) which advances the sheet to fusing station H. Fusing station H includes a fuser assembly, indicated generally by the reference numeral 780, which permanently affixes the transferred powder image to support material 840. Preferably, fuser assembly 780 comprises a heated fuser roller 782 and a backup or pressure roller 784. Support material 840 passes between fuser roller 782 and backup roller 784 with the toner powder image contacting fuser roller 782. In this manner, the toner powder images are permanently affixed to support material 840. After fusing, a chute, not shown, guides the advancing sheets 28 to a catch tray, stacker, finisher or other output device (not shown), for subsequent removal from the printing machine by the operator.

After the sheet of support material 840 is separated from photoconductive surface of photoreceptor belt 710, the residual toner particles carried by the non-image areas on the photoconductive surface are removed therefrom. These particles are removed at cleaning station I using a cleaning brush or plural brush structure contained in a housing 790. The cleaning brush 795 or brushes 795 are engaged after the composite toner image is transferred to a sheet. Once the photoreceptor belt 710 is cleaned the brushes 795 are retracted utilizing a device incorporating a clutch (not shown) so that the next imaging and development cycle can begin.

Print engine controller 700 regulates the various printer functions. The print engine controller 700 preferably includes one or more programmable controllers, which control printer functions hereinbefore described. The print engine controller 700 may also provide a comparison count of the copy sheets, the number of documents being recirculated, the number of copy sheets selected by the operator, time delays, jam corrections, etc. The control of all of the exemplary systems heretofore described may be accomplished automatically, through the use of user interface 860 from the printing machine consoles selected by an operator, or through the use of a workstation 50 selected by the operator. Conventional sheet path sensors or switches may be utilized to keep track of the position of the document and the copy sheets.

While FIG. 7 shows an example of a digital imaging system incorporating the digital scanner 30 including the dynamic user interface of the present invention, it is understood that this method and apparatus could be used in any imaging system having any number of developer structures.

While the invention has been described in detail with reference to specific and preferred embodiments, it will be appreciated that various modifications and variations will be apparent to the artisan. All such modifications and embodiments as may occur to one skilled in the art are intended to be within the scope of the appended claims.

What is claimed is:

1. A method of updating settings displayed on a user interface of an image processing device, the method comprising:
    detecting from a user interface image processing settings for each of a plurality of image processing jobs;
    storing a plurality of image processing settings;
    determining from the stored plurality of image processing settings the most frequent image processing settings; and
    setting as a default setting for the user interface the determined most frequent image processing settings.

2. The method of claim 1, additionally comprising:
    determining if the determined most frequent image processing settings are used at least a predetermined amount; and
    wherein setting as the default setting the determined most frequent image processing settings occurs only if the determined most frequent image processing settings are used at least the predetermined amount.

3. The method of claim 2, wherein:
    storing a plurality of image processing settings comprises storing a predetermined number of image processing settings; and
    determining if the determined most frequent image processing settings is used at least a predetermined amount comprises determining if the determined most frequent image processing settings are used at least a specified percentage of the predetermined number.

4. The method of claim 3, wherein the specified percentage is 80%.

5. The method of claim 4, wherein the image processing device is an image scanner, and the image processing jobs are image scanning jobs.

6. The method of claim 3, wherein:
    detecting image processing settings comprises detecting a set of image processing settings for each of a plurality of image processing jobs;
    storing a plurality of image processing settings comprises storing a plurality of sets of image processing settings; and
    determining the most frequent image processing settings comprises determining the most frequent set of image processing settings.

7. The method of claim 1, wherein;
    detecting image processing settings comprises detecting a set of image processing settings for each of a plurality of image processing jobs;
    storing a plurality of image processing settings comprises storing a plurality of sets of image processing settings; and
    determining the most frequent image processing settings comprises determining the most frequent set of image processing settings.

8. The method of claim 1, wherein the image processing device is an image scanner, and the image processing jobs are image scanning jobs.

9. A method of updating image processing settings in an image scanner, the method comprising:
    receiving a scan image command that includes image processing settings;
    storing the image processing settings;
    analyzing the stored image processing settings after receiving a predetermined number of scan image commands, to identify the most frequent image processing settings; and
    remapping default image processing settings for the scanner to the most frequent image processing settings.

10. The method of claim 9, wherein:
    analyzing the stored image processing settings comprises analyzing multiple sets of image processing settings, each of which is from a scan image command; and
    remapping the default image processing settings comprises remapping default image processing settings for the scanner to the most frequent set of image processing settings.

11. The method of claim 10, wherein;
    analyzing the stored image processing settings additionally comprises determining if more than a predetermined portion of the sets of stored image processing settings have the most frequent image processing settings; and
    remapping the default image processing settings occurs only if more than the predetermined portion of the stored image processing settings have the most frequent image processing settings.

12. A dynamic user interface for a digital scanner, the interface comprising:
    means for receiving a scan image command including image processing settings;
    means for storing a plurality of image processing settings;
    means for analyzing the stored image processing settings to detect trends in the numbers of particular ones of the stored image processing settings; and
    means for remapping default image processing settings in the user interface based on the numbers of particular ones of the stored image processing settings.

13. The dynamic user interface of claim 12, wherein:
    the means for analyzing the stored image processing settings comprises means for determining the most frequent image processing settings among the stored image processing settings; and
    the means for remapping sets as the default image processing settings the most frequent image processing settings.

14. The dynamic user interface of claim 13, wherein the means for remapping sets as the default image processing settings the most frequent image processing settings only if the most frequent image processing settings comprise at least a predetermined proportion of the stored image processing settings.

15. The dynamic user interface of claim 12, wherein:

the means for analyzing the stored image processing settings comprises means for determining if a high proportion of the stored image processing settings consist of a particular set of image processing settings; and the means for remapping selects as the default image processing settings the particular set of image processing settings.

16. The dynamic user interface of claim 15, wherein the means for remapping selects the particular set of image processing settings only for the default image processing settings only if the proportion of the stored image processing settings that consist of the particular set of image processing settings exceeds a predetermined portion.

17. The dynamic user interface of claim 16, wherein the predetermined portion is 80%.

* * * * *